(No Model.) 2 Sheets—Sheet 1.
V. DREWSEN.
APPARATUS FOR SEPARATING GASES.
No. 565,263. Patented Aug. 4, 1896.
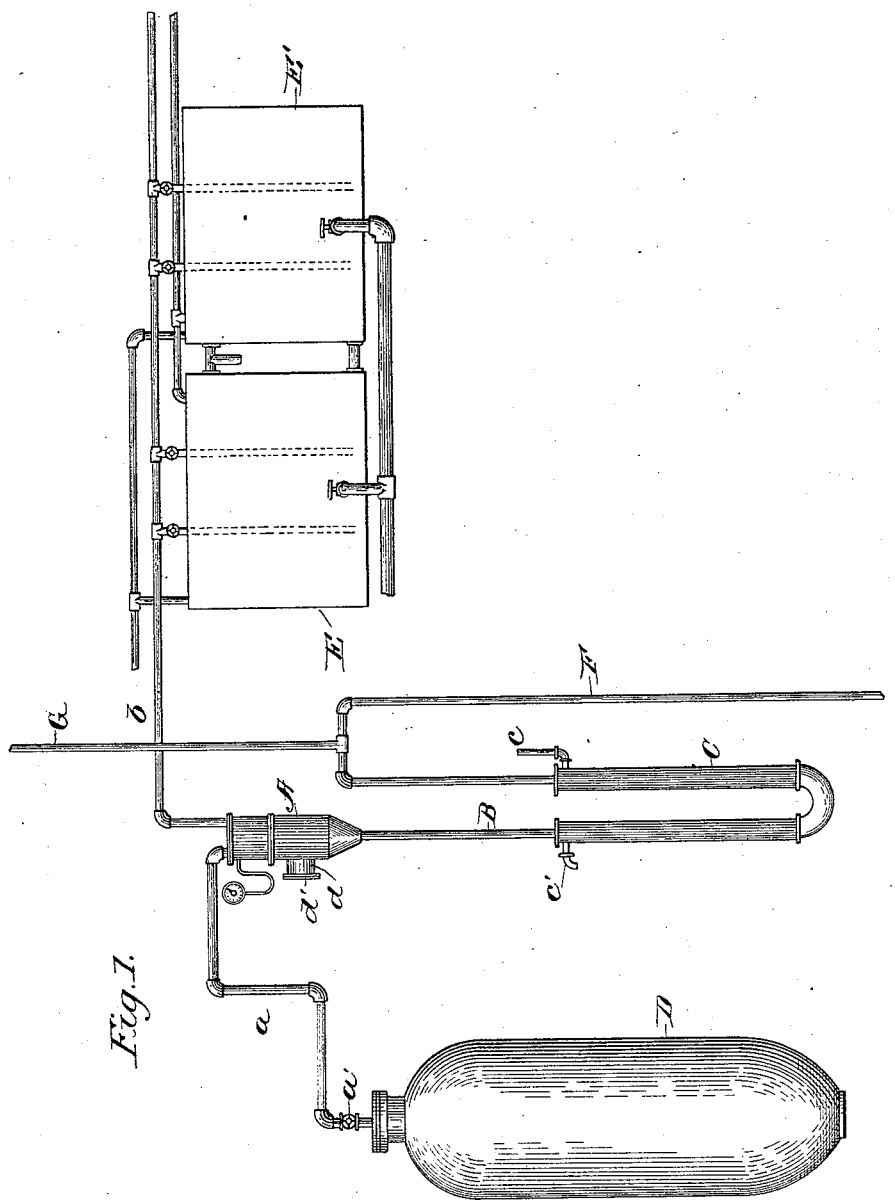
WITNESSES:
INVENTOR
ATTORNEY.

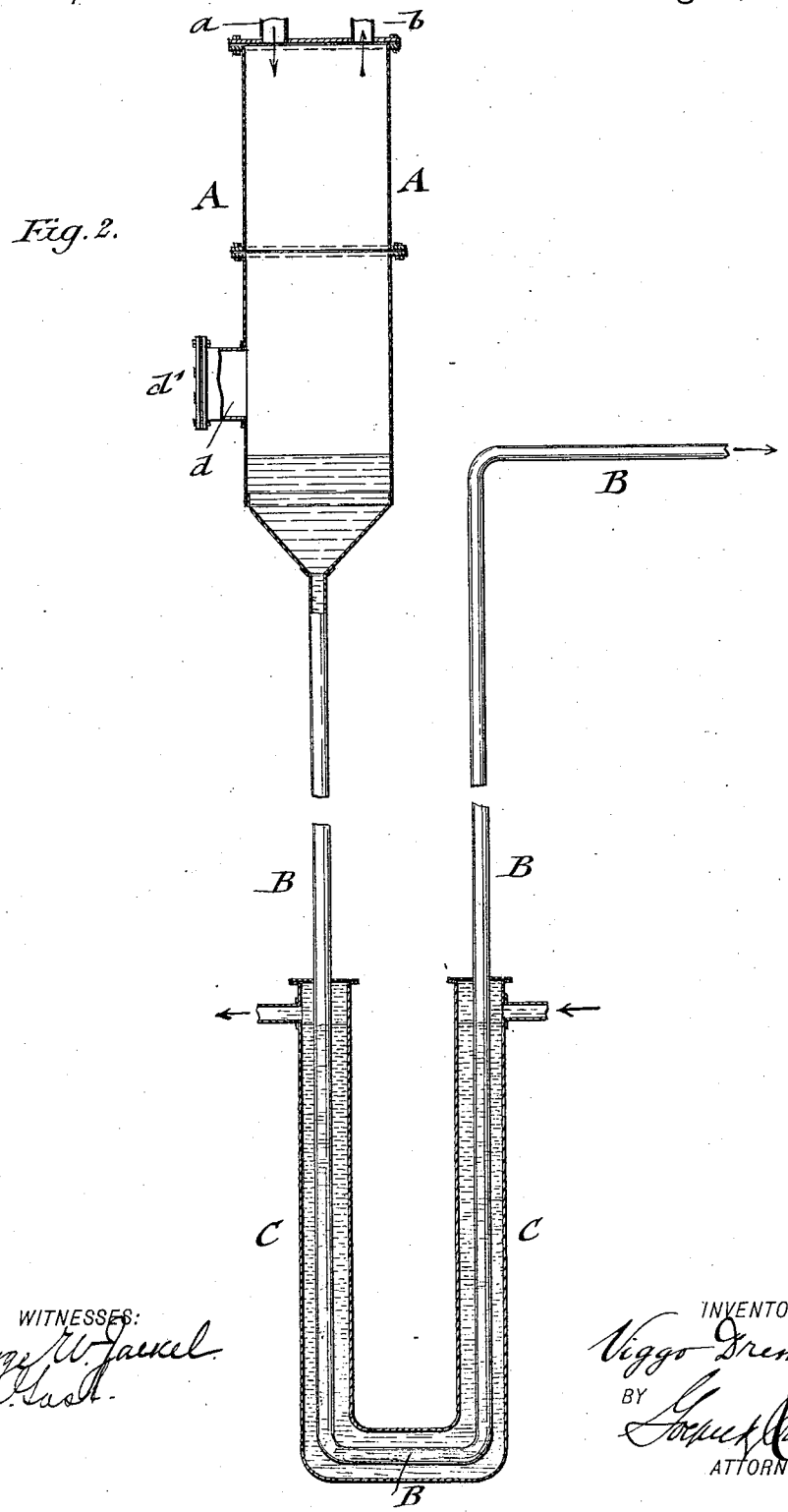

UNITED STATES PATENT OFFICE.

VIGGO DREWSEN, OF SANDY HILL, NEW YORK.

APPARATUS FOR SEPARATING GASES.

SPECIFICATION forming part of Letters Patent No. 565,263, dated August 4, 1896.

Application filed June 12, 1895. Serial No. 552,510. (No model.)

*To all whom it may concern:*

Be it known that I, VIGGO DREWSEN, a citizen of the Kingdom of Norway, residing at Sandy Hill, in the county of Washington, in the State of New York, have invented certain new and useful Improvements in Apparatus for Separating Gases from Liquids Under Pressure, of which the following is a specification.

In the making of paper-pulp from wood by the sulfite process, the wood, in the form of chips, is cooked to disintegration and decomposition in a digester containing sulfite liquor under steam pressure and heat. During the cooking process a valve is opened at frequent intervals and sulfurous-acid gas blown off from the digester, which is afterward used in cooking a subsequent charge. In the blowing off, particles of the cooking liquor are carried off with the gas, and it is desirable to separate such particles of the liquor from the gas, as such liquor is impregnated with the impurities resulting from the decomposition of the wood in the digester, and these impurities have a damaging effect upon the subsequent charge.

The object of this invention is to provide a simple and convenient means for separating the impure particles of cooking liquor from the sulfuric-acid gas blown off during the cooking operation, so as to prevent the impurities thereof from being returned to the digester and damaging the product of the subsequent cooking operation.

Figure 1 of the accompanying drawings represents a side elevation of a pulp-digester and reclaiming-tanks provided with this apparatus. Fig. 2 represents an enlarged vertical section of the separator, constituting a part of this apparatus, and a pressure-tube attached thereto.

The same reference-letters indicate the same parts in both the figures.

In the drawings, D represents a digester for the production of paper-pulp by the sulfite process. This digester is provided with a pipe $a$, leading out from the top thereof, through which gas is blown off, usually from time to time, or sometimes continuously, the blowing off of the gas being regulated by a stop-cock $a'$. A separator A is connected at its top to the outer end of the pipe $a$, and the sulfuric-acid gas blown off from the digester, together with the particles of the cooking liquor carried therewith, is discharged into the top of this separating vessel A. An outlet-pipe $b$, for the escape of the gases from the separator A, leads out from the top of said separator to reclaiming-tanks E and E'. This separator is provided with a manhole, having a manhole-plate $d'$. A U-shaped pressure-tube B is connected at one end to the lower end of the separator A and at the other end with a discharge-pipe F, provided with an upwardly-extending vent-pipe G. This U-shaped pressure-pipe is of a sufficient height, say about thirty feet, and is filled with a suitable liquid, preferably water, so as to maintain a proper pressure in the separator A.

The U-shaped pressure-tube B is provided with a cooler C to prevent the liquid contained therein from being converted into steam and being blown off. This cooler is preferably in the form of a water-jacket surrounding the lower portion of said tube and provided with an inlet $c$ on the outer leg and an exit $c'$ on the inner leg, said inlet and outlet being connected with a faucet or other water supply. The liquid in the U-shaped pressure-tube is thus kept below the boiling-point.

In the use of the apparatus illustrated the gases, consisting mainly of sulfurous acid and steam, escaping from the digester D and having more or less spent bisulfite cooking liquor commingled therewith and containing organic substances from the wood cooked in the digester pass from said digester through the pipe $a$ into the top of the separator A. The liquor and gas are separated in the separator A, the liquid passing down the sides of the separator into the pressure-tube B and the gas passing out from the top of the separator through the pipe $b$ to the reclaiming or re-generating tanks E and E', containing lime for producing the gas for the next charge. When the pressure in the separating vessel A is equal to the atmospheric pressure, the level of the liquid in both legs of the pressure-tube B is the same. When the pressure in the separator is four pounds to the inch above normal atmospheric pressure, the liquid in the leg of the pressure-tube directly connected with the separator will be lowered about nine feet and the level of the liquid in the other leg will be raised to the same extent. The weight of this column of liquid will maintain the desired pressure in the separator. The liquid condensed in the separator and flowing into the leg of the pressure-tube directly connected therewith will cause an overflow of the other leg, which overflow will pass down the escape-pipe F. To prevent siphoning off of the liquid in the pressure-tube, the vent-pipe G is provided.

This apparatus is very effective and economical for separating gases from liquids under pressure, and is especially applicable for separating out the small quantities of cooking liquid which are carried along by the sulfuric-acid gases from the digester in making sulfite pulp. This apparatus for separating liquids under pressure from gases can also be employed for other uses in the industrial arts.

I claim as my invention—

1. The combination of a separator for separating a gas and a liquid, a U-shaped pressure-tube one leg of which is connected with said separator, said pressure-tube being adapted to contain a column of liquid for maintaining the pressure in said separator, and a cooler for said separator for maintaining the liquid in a liquid state.

2. The combination of a pulp-digester, a separator for separating a gas and a liquid, a pipe connecting said digester with said separator, means for carrying off the gas from said separator, a U-shaped pressure-tube, one leg of which is connected to said separator, for containing a column of liquid, and a cooler for said separator for maintaining the liquid in liquid form.

In testimony that I claim the foregoing as my invention I have signed my name in presence of two subscribing witnesses.

VIGGO DREWSEN.

Witnesses:
PAUL GOEPEL,
GEORGE W. JAEKEL.